Figures 1, 2:
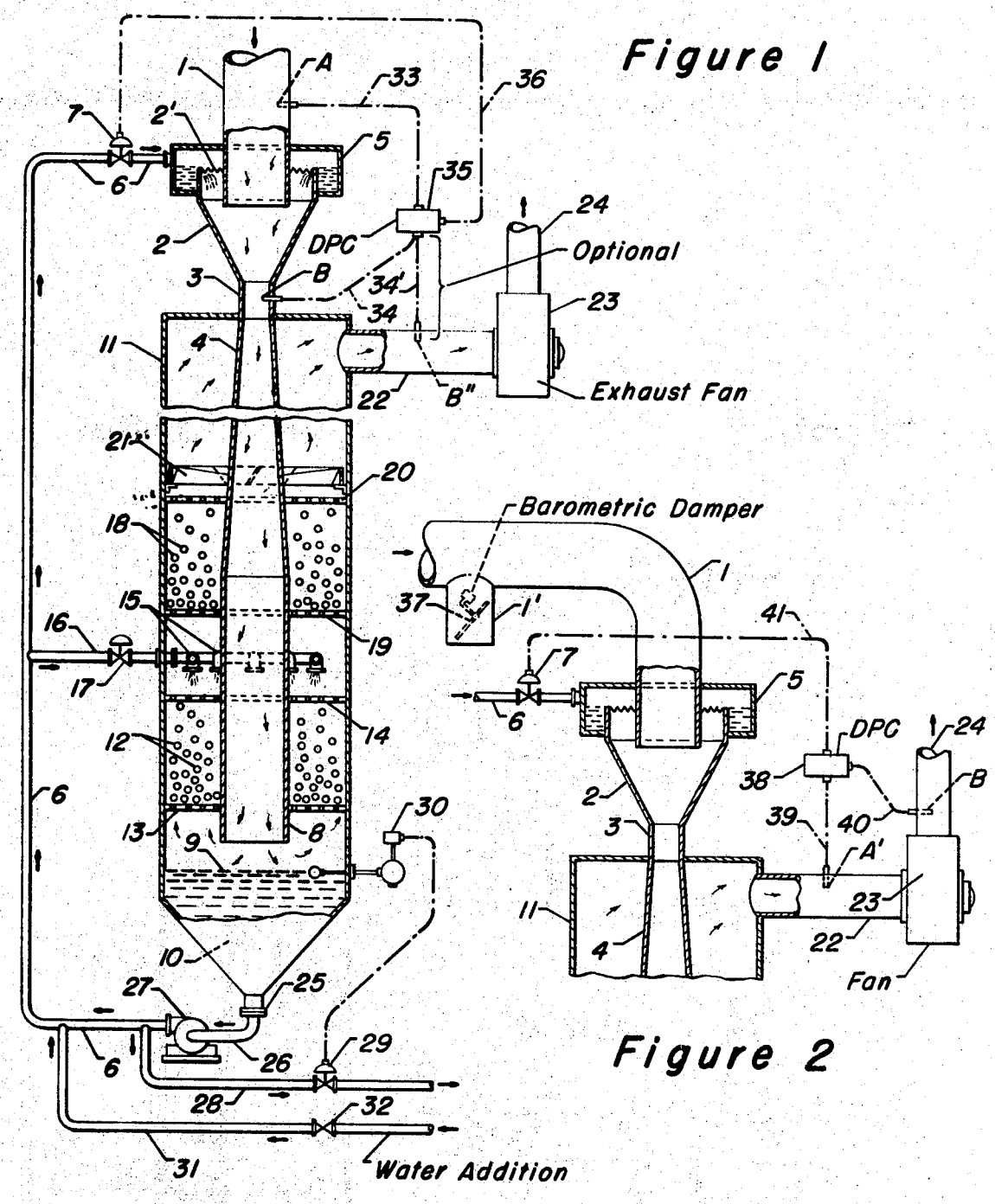

United States Patent [19]

Hardison

[11] 3,768,234
[45] Oct. 30, 1973

[54] VENTURI SCRUBBER SYSTEM INCLUDING CONTROL OF LIQUID FLOW RESPONSIVE TO GAS FLOW RATE

[75] Inventor: Leslie C. Hardison, Norwalk, Conn.
[73] Assignee: Universal Oil Products Company, Des Plaines, Ill.
[22] Filed: Dec. 17, 1969
[21] Appl. No.: 885,901

[52] U.S. Cl............... 55/223, 55/226, 55/227, 55/229, 55/233, 55/239, 55/241, 55/257, 261/94, 261/112, 261/DIG. 54
[51] Int. Cl............................................ B01d 47/10
[58] Field of Search............... 55/225, 226, 220, 55/257, 223, 227, 229, 223, 239, 241; 261/24, 39, DIG. 54, 95, 94, 112; 110/163; 13/1

[56] References Cited
UNITED STATES PATENTS

| | | | |
|---|---|---|---|
| 2,546,714 | 3/1951 | Bataille | 110/163 |
| 3,085,793 | 4/1963 | Pike et al. | 26/DIG. 54 |
| 3,167,413 | 1/1965 | Kiekens et al. | 55/225 |
| 3,212,761 | 10/1965 | Willett | 261/39 |
| 3,317,197 | 5/1967 | Lohner et al. | 261/24 |
| 3,348,825 | 10/1967 | McIlvaine | 55/257 X |
| 3,350,075 | 10/1967 | Douglas | 261/95 |
| 3,453,369 | 7/1969 | Dock | 13/1 |
| 2,604,185 | 7/1952 | Johnstone et al. | 261/DIG. 54 |
| 3,062,271 | 11/1962 | Rignsdorp | 137/100 X |
| 3,442,611 | 5/1969 | Allgood et al. | 23/165 |

FOREIGN PATENTS OR APPLICATIONS

45,132   11/1961   Poland.......................... 261/DIG. 54

OTHER PUBLICATIONS

"Buffalo" Multi-Stage Gas Scrubber, Bulletin AP-4500, July 7, 1966 Buffalo Forge Company, Buffalo, New York, all pages relied on.

Primary Examiner—Dennis E. Talbert, Jr.
Attorney—James R. Hoatson, Jr. and Philip T. Liggett

[57] ABSTRACT

In combination with a scrubber system which includes a venturi throat section for mixing a liquid with a laden gas stream, there are provided pressure measurement means in the flow path of the gas stream to provide a pressure drop measurement which shows an equivalent to pressure change across the venturi throat section. The system then effects, through differential pressure control means, an immediate change in liquid flow rate to such throat section responsive to the change in pressure drop such that a substantially constant pressure differential is maintained across the venturi and a resulting constant efficiency retained.

2 Claims, 2 Drawing Figures

INVENTOR:
Leslie C. Hardison

VENTURI SCRUBBER SYSTEM INCLUDING CONTROL OF LIQUID FLOW RESPONSIVE TO GAS FLOW RATE

The present invention is directed to an improved scrubber system which incorporates a venturi section and the means for maintaining a substantially constant pressure drop through the venturi throat section.

More particularly, the invention is directed to a venturi type scrubber system which provides for pressure measurements in the gas flow path and differential pressure control means operating responsive thereto so as to regulate liquid flow into the venturi throat section whereby a substantially constant pressure drop is maintained in such section and a resulting constant efficiency retained in the system.

High energy venturi type scrubbers are, of course, rather widely used in effecting an efficient cleaning of particle laden gaseous stream. The high velocity of the gas stream in the venturi throat section of the unit results in a breakdown of the liquid scrubbing stream which is fed to the throat, or fed upstream therefrom, so that there is a liquid entrapment of all of the entrained particles and a resulting high efficiency of particle removal for both the plus-micron and sub-micron particulates. There have been many types of provisions made in connection with venturi scrubber units to have variations in throat diameter in order to accommodate different gas flow rates or to modify the pressure drop to better accommodate a particular sized particulate; however, there are generally mechanical problems and accompanying disadvantages with the various throat adjustment means. In seeking an improved method of operation, it was found that the venturi scrubber system could make use of varying liquid input rates to the throat section in a manner to overcome changes in gas flow rates and provide a constant efficiency. Actually, the use of the system of the present invention with an automatic regulation of liquid introduction rate to the venturi throat section of the unit, there is accomplished the elimination of the need of a mechanical means for modifying the size of the throat in the venturi.

Thus, in one aspect, it may be considered a principal object of the present invention to provide an improved operation for a gas scrubbing system which includes a venturi section that will have control means that will vary the liquid input rate to such venturi responsive to changing gas flow rates through the system.

In a more particular aspect, it is an object of this invention to regulate liquid flow to the venturi throat section of the unit such that a substantially constant pressure drop is maintained across the venturi and resulting constant efficiency retained in the scrubbing system.

As a broad embodiment, the present invention provides in a scrubber system which includes a venturi throat section for mixing a scrubbing liquid with an incoming particle laden gas stream, means for collecting and removing the resulting liquid and particles, and a clean gas outlet conduit means with an exhaust fan, the improved method of operating the system to maintain a substantially constant pressure drop in the venturi throat section, which comprises, measuring a pressure drop in the gas flow path of said system by pressure measurements at spaced points therein to obtain a measure of change of pressure differential through the venturi throat section, and with differential pressure control means acting responsive to such pressure differenial change effecting the adjustment of scrubbing liquid flow into the venturi throat section of the system in a manner having liquid flow in inverse relation to the differential pressure change that is measured, whereby to maintain a substantially constant scrubbing efficiency for the system.

A measurement of the pressure drop in the scrubbing system which results from a change in laden gas flow rate may be made by having pressure tap means connecting to the gas inlet section to the venturi and pressure tap connection means to the throat section of the venturi. In an alternate arrangement, the pressure tap means may be across the entire scrubber unit, whether of one stage or of multiple stage design, so that one pressure tap means communicates with the gas inlet to the system and another connects with the cleaned gas outlet means from the system.

In still another arrangement, a measure of pressure drop through the throat section of the venturi scrubber portion may be determined by pressure tap measurement means being placed to show differential pressure across the exhaust gas fan at the outlet of the scrubber system. In other words, in any particular scrubber system the exhaust fan capacity will be limiting and the operation of the fan will be sensitive to changes in gas flow rate. As a result, where it is desired to keep a constant pressure drop across the throat section of the venturi, then it is of advantage to provide a system with a barometric damper and an auxiliary air inlet means to the particle laden gas inlet line so as to assist in maintaining a substantially constant quantity of gas flow through the venturi while, at the same time, the pressure differential measurement across the fan is utilized through connecting automatic control means to effect a variation of liquid flow into the throat section.

In all of the automatic control systems, as provided by the present invention, the pressure tap means connects to a differential pressure controller which will in turn connect to an automatic valve means that will regulate the liquid flow into the venturi portion of the scrubber unit. Further, the operation will be such that the liquid flow rate control means will act inversely responsive to pressure drop across the venturi throat section, as measured by the differential pressure control means. The advantage of the present arrangement, as hereinbefore pointed out, is the elimination of mechanical means which will vary the throat size of the venturi section of the unit in order to maintain a substantially constant pressure drop through the system. In other words, the liquid flow rate will be increased where gas flow rates are diminished and there would be a lessening of the pressure drop through the venturi so as to effect a compensating result from the increased liquid flow rate to in turn increase the pressure drop through the throat section and retain a substantially constant desired pressure drop through the system. Generally, variations in gas flow rate will be encountered in a typical processing operation so as to effect a uniform scrubbing of the laden gas stream.

The present improved system to retain a constant pressure drop through the venturi portion of a scrubber system in order to vary liquid input inversely responsive to pressure drop variations through the venturi may be made in a simple single stage venturi scrubber unit or, alternatively, the control system may well be used in combination with more complex multiple stage scrubber systems which include a venturi type scrubber portion as one stage of the more complex system.

Thus, in one preferred embodiment of a multiple stage scrubber system, there is provided means for the removal of fine particulate from a gas stream in an arrangement which comprises in combination, a vertically disposed funnel section with a gas stream inlet connecting to and discharging downwardly thereinto, a peripheral fluid trough means with a peripheral weir at the top of said funnel section to provide liquid overflow to the wall of said funnel section, a liquid inlet line to said trough means and adjustable fluid flow control means in said line, a venturi throat section extending from the bottom of said funnel section, an elongated open-ended tubular diffuser section extending below said venturi throat section which enlarges in diameter for at least a part of its length from its inlet portion, a confined housing positioned around at least the lower portion of said tubular diffuser section and spaced therefrom, said housing providing a liquid collecting sump section below the open lower end of said tubular diffuser section, horizontally disposed and spaced apart perforate members positioned around the latter section with said members providing at least one contact section containing a multiplicity of movable light weight contact elements, whereby to contact the gaseous stream reversing in flow from below said tubular section, gas outlet means from above said perforate members and said contact elements and connecting to gas outlet conduit means with an exhaust fan, conduit means and liquid recirculating means connecting said sump section to said fluid inlet line to said trough means, pressure differential measuring means connecting to pressure measuring tap means spaced apart in said gas stream flow path for said scrubber system to measure changes in gas flow rate and in pressure drop across said venturi throat section and means operating said adjustable fluid flow control means in said liquid inlet line to said trough means indirectly responsive to pressure differential changes measured whereby the liquid flow is varied to result in maintaining a substantially constant pressure drop operation in the venturi throat section of the system.

As hereinbefore pointed out, the pressure differential measuring means and the locations for measuring pressure drop in the gas flow path so as to obtain a measure of pressure differential through the venturi throat section may be varied in a manner which may be most convenient to a particular installation or type of exhaust gas stream which is to be treated.

Reference to the accompanying drawing of the following description thereof will serve to illustrate a scrubber system which incorporates a venturi scrubber section and, in addition, there are shown alternative means for measuring a pressure differential in the gas stream flow path so as to obtain a corresponding measurement of pressure drop through the throat section of the unit so that there can be means for obtaining an automatic regulating of liquid flow to the venturi throat section as a means for compensating for varying gas flow rates.

FIG. 1 of the drawing is a sectional elevational view of a multiple stage type scrubber system which incorporates a venturi section and automatic control means for regulating liquid flow to the venturi inlet and throat section of the unit.

FIG. 2 of the drawing provides a partial sectional view through the venturi throat section of the scrubber system and a modified differential pressure measuring arrangement which is across the exhaust fan of the system.

Referring now particularly to FIG. 1 of the drawing, there is shown a particle laden gas inlet line 1 which discharges into a venturi funnel section 2 that in turn carries the gas stream into a throat section 3 and thence into a gradually enlarging tube 4. The upper portion of the funnel section 2 encompasses the lower end of the conduit 1 and is serrated to provide a uniform scrubbing liquid flow down over its interior wall to the throat section 3. Also, in the present embodiment, the upper portion of the funnel section 2 is encompassed by a liquid retaining chamber which receives liquid by way of line 6 and automatic control valve 7.

In accordance with conventional venturi scrubber operations, the laden gas stream from conduit 1 is squeezed down by the funnel section 2 and provides a resulting high velocity gas stream in the throat section 3 such that there is an intermingling with the liquid flow descending along the wall of the funnel tube and a breakdown of the liquid into a mist which in turn tends to entrap all of the entrained solid particulates. The liquid entrapped particles are in turn carried on down stream from the throat section 3 through diffuser tube 4 where there is a regain of pressure for the gas stream. In the present embodiment, the bulk of the moisture content and particles will continue on from the lower end of the diffuser tube 4 into a still further elongated open-ended tube section 8 at a relatively high velocity such that the stream and entrapped particles will leave the lower end of the tube section 8 to impinge against the liquid surface 9 maintained in a sump section 10 for the scrubber unit.

Various means have been provided for transferring a scrubbed exhaust gas stream from a venturi section of a scrubber to a separator means such that water and particles may be collected and removed separately from the cleaned gas stream; however, in the present embodiment, there is provided a reverse flow arrangement with tube means 4 and 8 being centrally positioned in an encompassing housing 11 whereby the cleaned gas stream leaving the lower end of tube section 8 will reverse direction by 180° and then flow upwardly in the annular flow stream through one or more sections or stages of contact with mobile contact elements. In the embodiment shown, the contact elements 12 are in a lower stage between perforate plate 13 and 14 and such elements are preferably of spherical form and light weight, being of less density than water such that they may be readily fluidized and provide a turbulent action within the presence of the rising gas stream and a descending liquid flow, such as from nozzle means 15 in turn being supplied liquid by way of line 16 and control valve means 17.

In a superposed stage of elements 18 that are between perforate plate members 19 and 20, there is indicated the use of additional fluidized low density elements which will contact the rising gas stream above nozzle means 15. These elements, in effect, provide for the extraction of mist or liquid that is entrained with the cleaned gas stream carrying on up through chamber 11. As a still further means for effecting mist and liquid removal from the gas stream, there is indicated the use of a plurality of sloping spinner plates 21 above the top perforate plate section 20 so that remaining entrained liquid may be centrifically spun through chamber 11 and flow downwardly along to a contour section. The resulting substantially liquid free and cleaned gas stream then leaves chamber 11 by way of conduit or duct means 22 and the exhaust fan means 23 into an outlet stack section 24.

It will be noted that the present embodiment indicates one stage of contact elements 12 providing movable self-cleaning contact surfaces in the presence of a countercurrent gas-liquid flow; however, where desired, there may be more than one contact stage operating in the presence of added liquid descending through the several contact stages. Also, where desired, there may be more than one stage of contact elements, such as 18, above the zone of liquid introduction so as to effect mist removal from the system in a substantially non-clogging type manner. In other words, movable light weight contact elements are of particular advantage in providing a high surface area means which can contact and rub against one another in a self-cleaning manner rather than use conventional mesh packings or "chevron" type packing plates which will require periodic cleansings to insure a continued operation.

The spheres or other light weight contact elements which are maintained in the present embodiment as elements 12 and 18, may be of a size generally of from about one-half inch to about 3 inches in diameter, with the optimum size being selected with regard to the size of the chamber or to the size of the contact section being used in the system. Conventionally, the elements may be of about 1½ inch diameter and consist of plastic hollow spheres such as polyethylene or polypropylene. The spheres may also be made to have relatively large open holes in the wall whereby gas and liquid contacting may be carried on within the inner wall surfaces as well as on the outer walls. Also, the spheres will be of low density so that they will respond readily to the upflowing gas stream and can be easily maintained in a random motion. Thus, generally, the elements will have a density of less than 20 lbs/cu. ft. and preferably be within a range of about 2 lbs. to about 11 lbs/cu.ft. On the other hand, for corrosive gaseous stream or where a high temperature gaseous stream is encountered, then it may be advisable to utilize spheres or other contact elements which are formed to have a low density and made from stainless steel, aluminum, magnesium, etc., metal alloys or of various non-corrosive materials.

Generally, the gas flow through the one or more contact sections using fluidized spherical form elements will be of the order of 500 to 1,000 ft/min. while the liquid flow downwardly will be of the order of 5 to 100 gal./min./sq.ft. of cross sectional area of the contact zone. Also, in order that suitable random motion may be obtained, it is desirable that there be adequate spacing between screens or perforate plates of the order of 3 feet or more. Actually, other than for safety purposes, there need not be an upper restraining grid in many of the counter-current operations since the random motion of the contact elements will be maintained within a 2 to 4 foot spacing.

In the present illustrated embodiment, the lower end of chamber 11 is provided with a tapering portion serving as a sump section 10 and an outlet port means 25 connects with conduit 26 and pump means 27. The latter discharges into line 6 and into line 28 whereby there may be recirculation of liquid in the system to the upper venturi section of the unit by way of control valve 7 as well as to a second stage scrubbing zone by way of line 16 that is connective to nozzles 15. Still further, there is indicated a valve means 29 connecting to level control means 30 such that a portion of the liquid from sump section 10 may be discharged from the system and a substantially constant liquid level 9 maintained in the sump section 10 of the system. For purposes of water addition to the system, line 31 with valve 32 is shown connective with the recirculation conduit 6.

In accordance with the present invention and in order to maintain a desired substantially constant pressure drop through the venturi section of the system, there is provided a pressure measurement means A within conduit 1 and pressure measurement means B in the throat section 3. Lines 33 and 34 in turn transfer the pressure indications to a differential pressure controller 35. The measurement means A and B may be standardly available pressure sensing devices to provide a pneumatic pressure or electric signal; however, small open tubes 33 and 34 may provide a transmittal of pressure directly to the differential pressure device incorporated in 35. The latter may comprise a standard liquid manometer, a liquid seal, or the inverted bell-type differential pressure sensing means, but present more commonly commercially available types of devices make use of bellows, diaphragms, sealed capsules, etc., in force balance differential pressure measuring cells to provide a resultant or electric output signal. Reference may be made to Chapter 7 of "Principles and Practice of Flow Meter Engineering" by L. K. Spink; Ninth Edition, published in 1967, by The Foxboro Company, through the Plimpton Press, Norwood, Mass. The latter, in turn, through line 36 regulates the valve 7 in line 6 in a manner to control liquid flow through the latter into the reservoir 5 and to the weir means 2' whereby the water flow rate to section 3 is in a manner inversely responsive to pressure drop readings received by the differential pressure controller 35. As a result, in an operation where a reduced gas flow to the system provides an indication of pressure drop in the venturi, there is in turn a resulting increase in flow of water to section 5 and to the interior wall of the funnel section 2 and the throat section 3. Thus pressure drop is again increased or maintained at a substantially constant desired level. Scrubbing efficiency through a high energy venturi scrubbing unit is directly related to the pressure drop in the system so that where it is desired to have a relatively steady state high efficiency operation the pressure in the throat section must be uniformly retained. As previously set forth, a liquid modification in flow rate is by the means of the present invention an ideal method for retaining a desired pressure drop in lieu of the use of mechanical throat adjustment means whereby area of the throat section is restricted or increased to take care of lessening or increasing gas flow rates to the venturi section.

Inasmuch as it is desired to have the liquid flow rate change inversely responsive to gas flow rates into the system and to the pressure drop across the venturi throat section there are, as has also been previously noted, varying positions of locations in the gas flow path which can provide the measure of pressure drop in the venturi section. For example, pressure tap B may be removed or located at position B" in conduit 22, in lieu of the throat location, and the pressure differential provided between A and B" will show a pressure drop through the entire multiple stage scrubbing system. Thus, with a differential pressure controller means 35 acting responsive to pressure measurements through lines 33 and 34' there will be the automatic adjustment of valve 7 to increase water flow rates for lessening inlet gas flow rates from conduit 1 or, conversely, a lessening of the water flow rate for increasing gas flow rates.

With reference to FIG. 2 of the drawing, there is indicated still another method of effecting automatic control of water flow rate to the venturi section so as to give the desired constant pressure drop through the venturi section. In this instance, pressure differential is measured across the fan means 23 rather than across the venturi portion of the scrubbing unit. Specifically, in the modification of FIG. 2, the inlet duct is provided with a barometric damper opening means 1' and an adjustable weight barometric type damper 37, whereby during periods of reduced gas flow through conduit means 1 there will be an intake of air to assist in maintaining a substantially even quantity of gas flow through the venturi section of the scrubber system. Also, in this modified arrangement, there are provided pressure measurement means A' and B' in respectively the duct means 22 and 24 on each side of the exhaust fan 23 whereby there may be a pressure differential measured corresponding to pressure drop changes across the venturi section of the scrubber unit. In other words, with reduced gas flow rates into conduit means 1, there will be a corresponding differential pressure change across fan 23 and with the differential pressure measurement taken at this zone, in lieu of taking place at the venturi, then differential pressure controller 38 receiving measurements by way of line 39 and 40 can, through line 41, adjust the control valve 7 to vary the liquid flow into reservoir 5 and into the venturi throat section 3. Again the operation will be such that a decreasing pressure differential between points A' and B' will have control means 38 open valve means 7 so as to increase liquid flow rate into the throat and provide an increase in pressure drop through the venturi section. Conversely, where the gas flow rate is increased and the pressure differential reading at 38 is higher, then there will be a corresponding decrease in liquid flow rate through valve 7 to provide a desired reduction in liquid flow to throat section 3 and the retention of a desired pressure drop in the venturi scrubbing section.

It should be pointed out that the present drawing is diagrammatic and that there may be various modifications and arrangements or designs with respect to the venturi section or with respect to the one or more stages of countercurrent flow through contact elements. For example, in connection with the venturi portion, there may be a direct adjustment with respect to liquid introduction into the throat section 3 rather than having the fluid pass down over the inlet funnel section 2. In connection with the housing or chamber 11, there may be a positioning of contact elements 12 and 18 in their corresponding contact sections which are entirely to one side of a descending diffuser tube section of the venturi in lieu of the concentric arrangement set forth in FIG. 1 of the drawing.

It is also to be particularly noted that in certain installations, a secondary stage of scrubbing such as provided by nozzles 15 to supply liquid down over and through conduit elements 12 above perforate plate section 13 may be eliminated by shutting off control valve 17 and such contact elements are utilized primarily as mist extracting elements. In still other instances, modification may be made with respect to the design and arrangement of plates 21 which are used above mist elements 18 so as to provide variations in water removal aspects for the cleaned gas stream leaving outlet conduit means 22.

I claim as my invention:

1. A scrubber system for the removal of fine particulates from a gas stream which comprises in combination, a vertically disposed funnel section with a gas stream inlet connecting to and discharging downwardly thereinto, a peripheral fluid through means with a peripheral weir at the top of said funnel section to provide liquid overflow to the wall of said funnel section, a liquid inlet line to said trough means and adjustable fluid flow control means in said line, a venturi throat section extending from the bottom of said funnel section, an elongated open-ended tubular diffuser section extending below said venturi throat section which enlarges in diameter for at least a part of its length from its inlet portion, a confined housing positioned around at least the lower portion of said tubular diffuser section and spaced therefrom, said housing providing a liquid collecting sump section below the open lower end of said tubular diffuser section, horizontally disposed and spaced apart perforate members positioned around the latter section with said members providing at least one contact section containing a multiplicity of movable light weight contact elements, whereby to contact the gaseous stream reversing in flow from below said tubular section, gas outlet means from above said perforate members and said contact elements and connecting to gas outlet conduit means with an exhaust fan, conduit means and liquid recirculating means connecting said sump section to said fluid inlet line to said trough means, pressure differential measuring means connecting to pressure measuring tap means spaced apart in said gas stream flow path for said scrubber system to measure changes in gas flow rate and in pressure drop across said venturi throat section and means operating said adjustable fluid flow control means in said liquid inlet line to said trough means indirectly responsive to pressure differential changes measured whereby the liquid flow is varied to result in maintaining a desired pressure drop operation in the venturi throat section of the system said pressure differential measuring means being connected to pressure measuring tap means located each side of the exhaust fan in said gas outlet means to provide a measure of pressure drop changes taking place across the venturi portion of said system.

2. The scrubber system of claim 1 still further characterized in that additional air inlet means is provided to said gas stream inlet and barometric damper means is provided in combination with said additional air inlet means, whereby there is maintained a more uniform quantity of gas flow to said venturi section where the gas stream flow rate diminishes.

* * * * *